(12) United States Patent
Hogan et al.

(10) Patent No.: US 9,507,765 B2
(45) Date of Patent: Nov. 29, 2016

(54) DISPLAYING ROTATED TEXT INSIDE A TABLE CELL

(71) Applicant: APPLE INC., Cupertino, CA (US)

(72) Inventors: Edward Patrick Anthony Hogan, Pittsburgh, PA (US); Paul Hankes Drieslma, Belmont, CA (US)

(73) Assignee: APPLE INC., Cupertino, CA (US)

( * ) Notice: Subject to any disclaimer, the term of this patent is extended or adjusted under 35 U.S.C. 154(b) by 476 days.

(21) Appl. No.: 13/724,485

(22) Filed: Dec. 21, 2012

(65) Prior Publication Data

US 2014/0181628 A1 Jun. 26, 2014

(51) Int. Cl.
G06F 17/00 (2006.01)
G06F 17/24 (2006.01)
G06F 17/21 (2006.01)

(52) U.S. Cl.
CPC ........... *G06F 17/245* (2013.01); *G06F 17/214* (2013.01)

(58) Field of Classification Search
CPC ... G06F 17/245; G06F 17/246; G06F 17/214
USPC ........................................ 715/227
See application file for complete search history.

(56) References Cited

U.S. PATENT DOCUMENTS

| | | | |
|---|---|---|---|
| 6,782,142 B2 | 8/2004 | Loce et al. | |
| 7,362,311 B2 | 4/2008 | Filner et al. | |
| 8,078,955 B1 * | 12/2011 | Gupta | 715/217 |
| 8,217,947 B2 * | 7/2012 | Roth | 345/467 |
| 8,249,391 B2 * | 8/2012 | Curtis | 382/289 |
| 2002/0158876 A1 | 10/2002 | Janssen | |
| 2011/0179345 A1 | 7/2011 | Capela et al. | |
| 2012/0096344 A1 | 4/2012 | Ho et al. | |
| 2012/0318077 A1 * | 12/2012 | Paca | 73/865.4 |

OTHER PUBLICATIONS

Mark Smitton, Spreadsheet Republic, "Change Text Orientation in Excel 2007", Jan. 23, 2012, (PDF version, 7 pages), can be retrieved at <http://www.spreadsheetrepublic.com/change-text-orientation-in-excel-2007/>.*
Mark Smitton, Spreadsheet Republic, "Wrap Text in Excel 2007", Jan. 23, 2012, (PDF version, 6 pages), can be retrieved at <http://www.spreadsheetrepublic.com/wrap-text-in-excel-2007/>.*
Paul Dawkins, "Trig Cheat Sheet", 2005, 4 pages, can be retrieved at <http://tutorial.math.lamar.edu/pdf/Trig_Cheat_Sheet.pdf>.*

* cited by examiner

*Primary Examiner* — Stephen Hong
*Assistant Examiner* — Marshon Robinson
(74) *Attorney, Agent, or Firm* — Fletcher Yoder PC (57) ABSTRACT

Approaches are described for displaying rotated character strings within cells of tables. In particular embodiments, the display of the rotated character string is handled such that the character string does not extend beyond the edges of the cell. Further, in certain implementations, the character string may be displayed as wrapped and rotated text within the cell, wherein each line of the wrapped character string does not extend beyond the edges of the cell.

19 Claims, 5 Drawing Sheets

DISPLAYING ROTATED TEXT INSIDE A TABLE CELL

BACKGROUND

The present disclosure relates generally to the rotation of text within a document.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In various computer-implemented applications, users may be provided with the capability of defining tables for use in a document (such as a word processing document, a spreadsheet, a slide of a presentation, and so forth). Such tables typically include a number of cells in which a user can insert content (e.g. textual content, including numbers, words, and so forth). In certain instances, a user may wish to rotate textual content within a cell so as to have the content displayed at an angle relative to the boundaries of the cell. Such rotated text may be difficult to display using conventional approaches and may, as a consequence be displayed in an inelegant or aesthetically unappealing manner For example, portions of the rotated text may be displayed outside boundaries of the cell in which the text is supposed to reside. Such display issues with respect to rotated text may be exacerbated in instances where there is a sufficient amount of text in the cell to trigger wrapping of the text when displayed within the cell (i.e., the display of multiple lines of text within the cell).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The presently disclosed approaches relate to the display of rotated text within a cell of a table, where the table may be displayed as part of a work space of a suitable productivity application implemented on a processor-based system. In certain implementations, the text that is to be rotated within a table cell is characterized by its length and characters, and the angle for rotation. In addition, the height and width of the table cell are also known. Based on this information, the text may be organized into suitably sized fragments so as to be accommodated within the cell at the specified angle. The table cell (and the corresponding row and column of cells) may be sized to accommodate the rotated text so as to prevent spill-over of text outside the cell or to prevent text from being cut off at the cell boundaries.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, certain types of applications (such as productivity applications running on processor-based system) may provide a user with the option to place a table within a document (i.e., a word processing document, a spreadsheet, a slide of a presentation application, and so forth). Such tables typically consist of cells, in which the user can enter textual content (i.e., numbers, letters, words, and so forth). In certain instances, the content added to such a table cell may be formatted to be rotated within the cell. As discussed herein, present embodiments may address various approaches to facilitate rotation of the content of a table cell.

Figure 1:
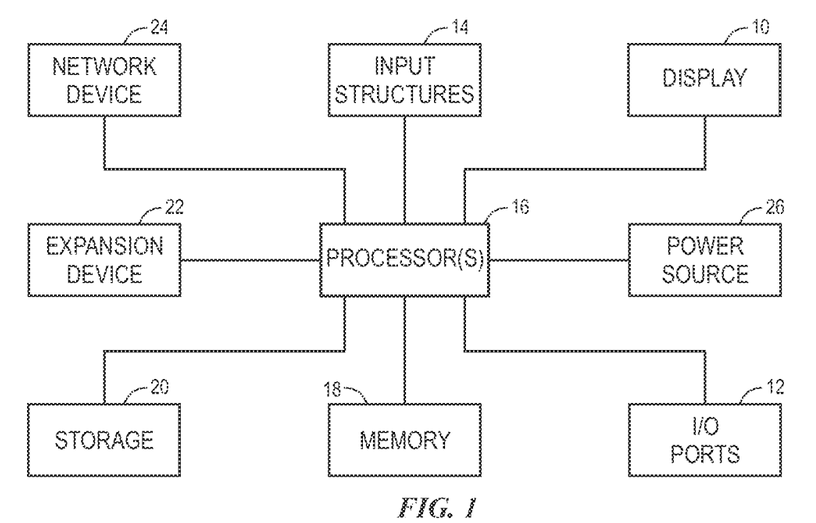
FIG. 1 is a block diagram of components of an example of an electronic device, in accordance with aspects of the present disclosure.
Figure 2:
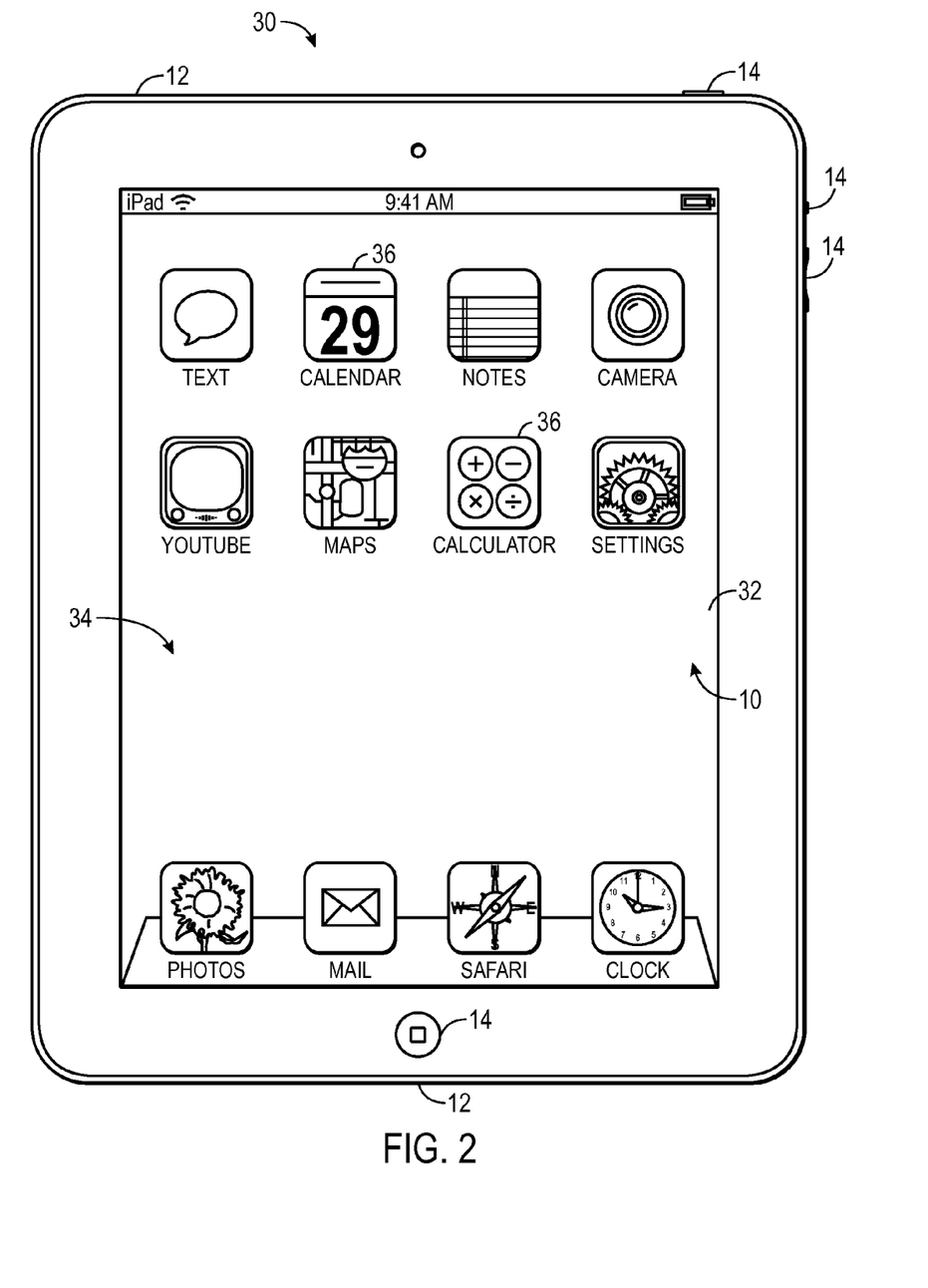
FIG. 2 is a perspective view of an example of a handheld electronic device, in accordance with aspects of the present disclosure.
Figure 3:
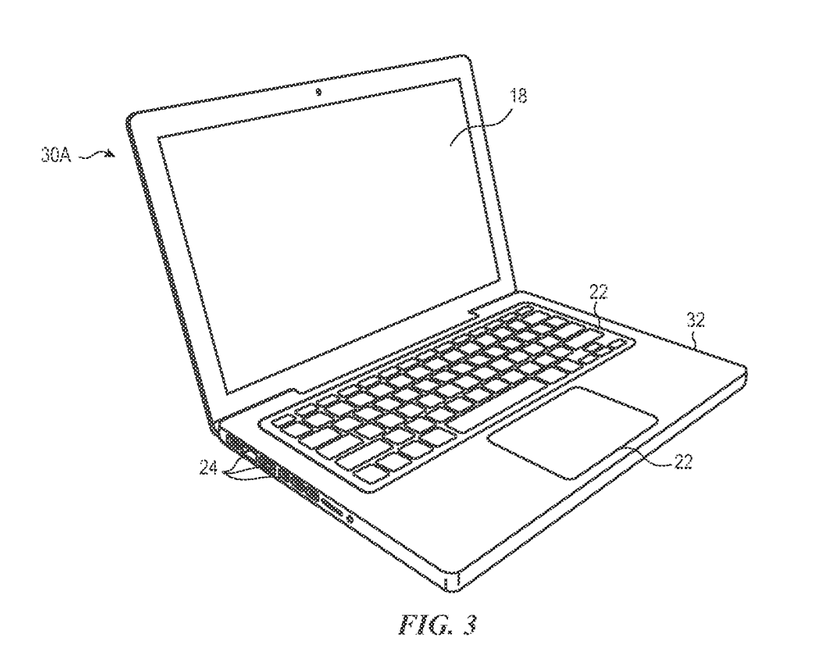
FIG. 3 is a perspective view of an example of a laptop electronic device, in accordance with aspects of the present disclosure.

With the foregoing in mind, a general description is provided below of suitable electronic devices that may be used in the implementation of the present approaches to object management. In particular, FIG. 1 is a block diagram depicting various components that may be present in an electronic device suitable for running an application that allows for the display of tables and for the rotation of text within cells of such tables. FIGS. 2 and 3 respectively illustrate perspective and front views of suitable electronic devices, which may be, as illustrated, a handheld electronic device (e.g., a tablet computer) or other mobile computing device (e.g., a laptop computer).

An example of an electronic device suitable for the techniques described herein may include various internal and/or external components. For example, FIG. 1 is a block diagram illustrating the components that may be present in such an electronic device 8, allowing the electronic device 8 to function. One of ordinary skill in the art will appreciate that the various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be an LCD, OLED-type display, or other suitable display device. Additionally, in certain embodiments of the electronic device 8, the display 10 may be provided in conjunction with a touch-sensitive element, such as a touchscreen, that may be used as part of the control interface for the device 8 and, further, may be used in conjunction with the presently disclosed approach to enter content into cells of a table or to rotate content entered into cells of a table displayed on the touchscreen.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 or Firewire™ port, a Thunderbolt™ port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touchscreen, where a touch sensitive mechanism is provided in conjunction with the display 10. In such embodiments, the user may select or interact with displayed interface elements (such as column or row elements of a displayed table) via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces (e.g., a word processor, spreadsheet, database, or presentation application user interface), and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more central processing units (CPUs), physics processors, graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard; any 2G, 3G, or 4G cellular data standard; or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter and suitable connector port. This power adapter may also be used to recharge one or more batteries, if present.

With the foregoing in mind, FIG. 2 illustrates an electronic device 8 in the form of a handheld device 30, here a tablet computer. By way of example, the handheld device 30 may be a model of an iPad®, iPod®, or iPhone® available from Apple Inc. of Cupertino, Calif. It should be noted that while the depicted handheld device 30 is provided in the context of a tablet computer, other types of handheld devices (such as media players for playing music and/or video, personal data organizers, handheld game platforms, e-readers, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, an e-reader, a personal data organizer, and so forth.

For example, in the depicted embodiment, the handheld device 30 is in the form of a tablet computer that may provide various functionalities (such as the ability to take pictures, record audio and/or video, listen to music, play games, map travel routes, and so forth) in addition to running applications, such as productivity software, capable of displaying and manipulating content within table cells. As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a tablet computer implementation, one or more of the input structures 14 may be configured to invoke a "home" screen or menu to be displayed, to toggle between a sleep and a wake mode, adjust the volume of audible feedback, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a mouse, wheel, or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted tablet computer of FIG. 2, an electronic device 8 may also take the form of a computer or other type of electronic device. Such computers may include computers that are generally portable (such as laptop or notebook computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3, in accordance with one embodiment of the present disclosure. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard, mouse, and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port, Thunderbolt® port, or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications (e.g., productivity and/or presentation applications having a user interface).

With the foregoing discussion in mind, an electronic device 8, such as either a handheld electronic device 30 or computer 50, may be used to store and run an application that allows a user to enter content into a cell of a table and to instruct that such content be displayed in a rotated orientation with respect to the cell. The present disclosure relates to approaches and algorithms whereby such rotation of content within a cell may be accomplished without being cut off at the boundary of the cell or without being at least partly displayed outside the boundary of the cell.

Figure 4A:
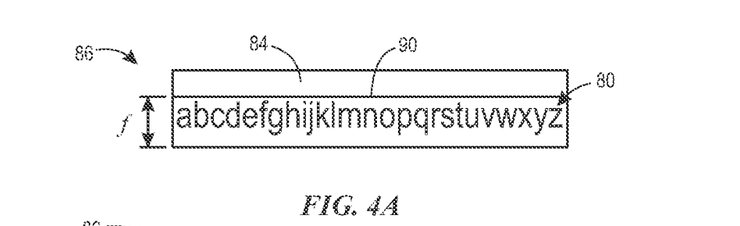
FIG. 4A depicts a string of unrotated characters in a table cell.
Figure 4B:
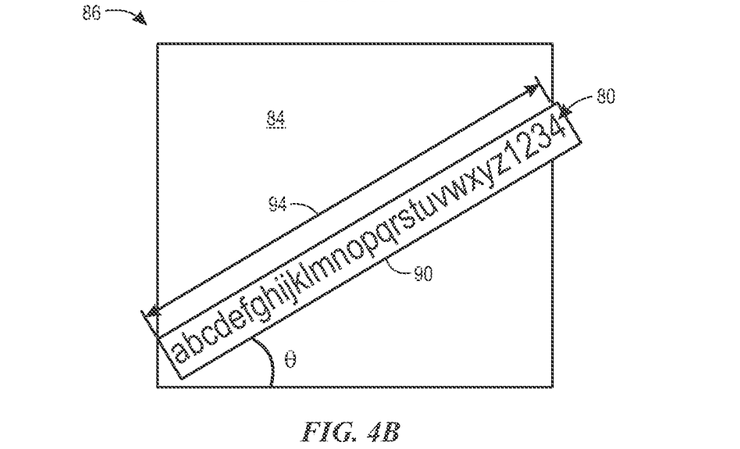
FIG. 4B depicts a first rotated string of characters in a table cell where the first rotated string is outside the cell boundaries.
Figure 4C:
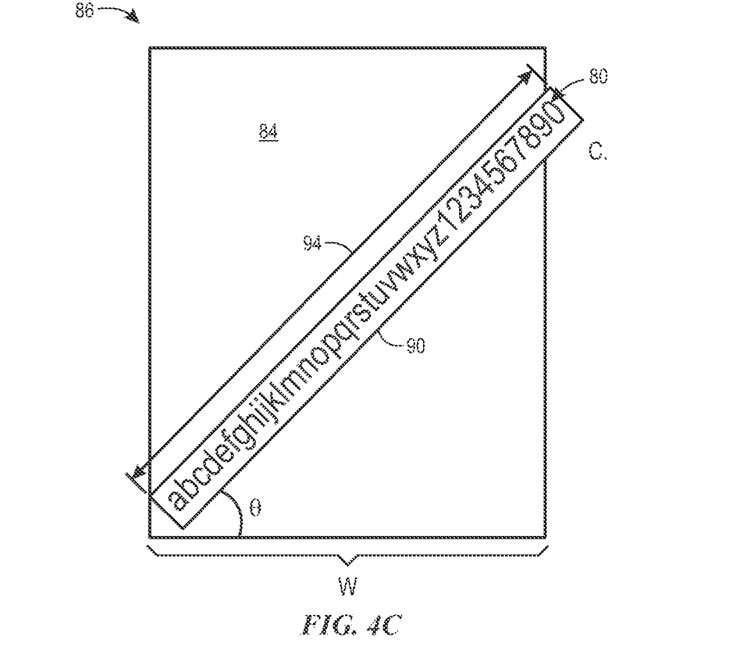
FIG. 4C depicts a second rotated string of characters in a table cell where the second rotated string is outside the cell boundaries.
Figure 5A:
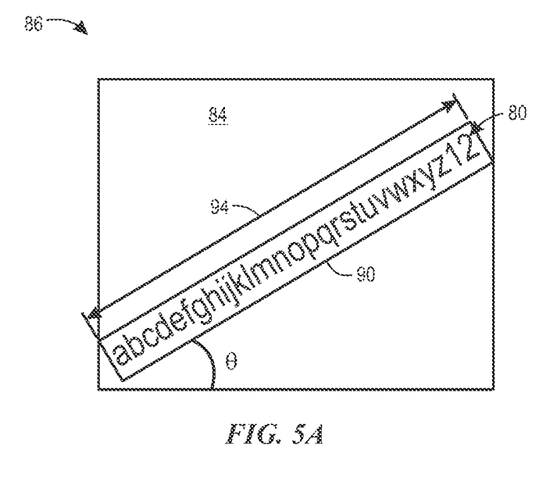
FIG. 5A depicts a first rotated string of characters in a table cell in accordance with aspect of the present disclosure.
Figure 5B:
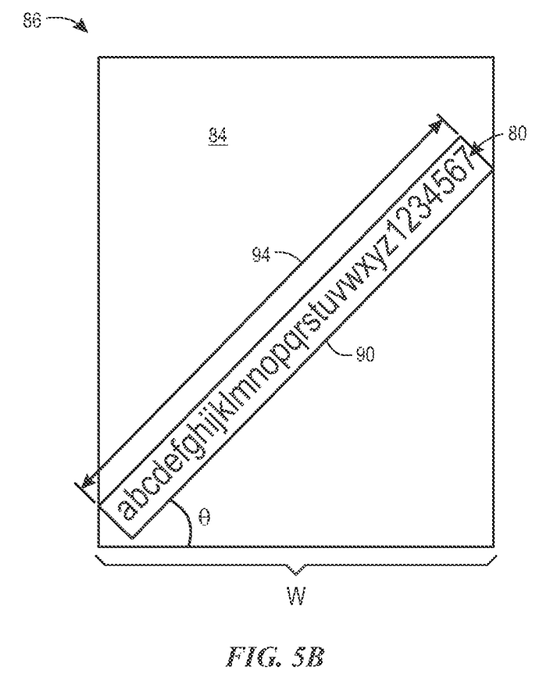
FIG. 5B depicts a second rotated string of characters in a table cell in accordance with aspect of the present disclosure.

With this in mind, and turning to FIGS. 4A-4C, an example is provided of a character string 80 for display in a cell 84 of a table 86. In FIG. 4A, the character string 80 is not rotated with respect to the respective cell 84. For the purpose of illustration, the character string 80 is depicted within a rectangular text box 90 with respect to which the character string 80 is maintained in a normal (e.g., unrotated) orientation. As will be appreciated, though used herein to facilitate explanation of the present concepts, the text box 90 is typically not displayed or visible in a real world implementation, but when present may instead be a hidden construct that facilitates the display (and rotation) of a character string 80 while itself being hidden). In the example of FIG. 4A where the character string 80 is not rotated with respect to the underlying cell 84, the rectangular text box 90 corresponds in orientation to the cell 84. As will be appreciated, both the cell 84 and the character string 80 may be characterized by various measures, such as the width (ω) of the cell 84 and the height (f) of the font associated with the character string 80.

Turning to FIG. 4B, the character string 80 of FIG. 4A is shown rotated with respect to the underlying cell 84 by an angle θ that is normalized to a value between 0° and 90°. Thus, in this example the character string 80 remains at a normal orientation with respect to the text box 90, though the text box 90 and character string 80 are both rotated by θ with respect to the underlying cell 84. Likewise, FIG. 4C depicts the character string 80 (and associated text box 90) rotated with respect to the underlying cell 84 at an even greater angle θ.

In these examples, the length 94 of the top or base of the rotated text box 90 can be calculated as $$\omega \cdot \sec \theta \quad (1)$$

such that the cell width x the secant of θ gives the length 94 (i.e., the length of the top or base) of the text box 90 measured in the units associated with ω (e.g., pixels, inches, and so forth). Thus, as depicted, the rotated text box is longer than the unrotated text box. That is, the length 94 of a long edge of the text box 90 is greater when rotated relative to the cell 84 than when not rotated. As a consequence, the character string 80 that will fit within the rotated text box 90 may be longer, as depicted in FIGS. 4A, 4B, and 4C.

However, it can also be seen in the present examples that, even though the character string 80 may be longer when rotated, the lengthened character string may inadvertently be displayed outside the bounds of the cell 84 because the rotated text box 90 may exceed the bounds of the cell 84. Thus, with this understanding of the length 94, and as depicted in FIGS. 4B and 4C, not all of character string 80 fits within the boundary of the cell 84 when rotated. As depicted, the overrun of the characters string 80 outside the bounds of cell 84 occurs because the character string 80 is fitted within the rotated text box 90 and the length 94 of the text box 90, when rotated, exceeds the width of the cell 84.

As will be appreciated, it may be aesthetically unappealing for the rotated character string 80 to exceed the bounds of the cell 84 in which the character string 80 is displayed. Therefore, as discussed herein, in certain implementations to fit the character string 80 within the cell 84 the length 94 of the text box 90 may be reduced (i.e., shortened), such as by the amount that would otherwise extend past the boundary of cell 84. For example, the amount of the bottom line of text box 90 that will extend past the boundary of cell 84 at angle θ can be characterized by:

$$f \cdot \tan \theta \quad (2)$$

where f is the font height of the character string 80 in question (measured in the same units as cell width ω and text box length 94). With this knowledge, the length 94 of the text box 90 can then be shortened (i.e., reduced in length) by this amount such that:

$$\omega \cdot \sec \theta - f \cdot \tan \theta \quad (3)$$

and the text box 90, when rotated by θ, will not extend beyond the edges of cell 84. As much of the character string 80 as will fit within the shortened text box 94 can then be displayed within the rotated text box 90. That is, though the character string 80 displayed in the rotated text box 90 may be longer than that displayed in an unrotated text box, the length of the character string 80 displayed is still shorter than when the length 94 of the text box is not shortened to fit within the bounds of cell 84, as can be seen in FIGS. 4B and 5A and FIGS. 4C and 5B.

While the preceding describes implementations whereby a character string 80 may be displayed rotated within a cell 84 of a table 86 without exceeding the bounds of the cell 84, it should be appreciated that in certain embodiments it may be desirable to see the entirety of the characters string 80 displayed, without truncation. In such circumstances, it may be desirable to wrap the display of the character string 80 to consecutive displayed lines within the cell 84 so that the entire character string 80 is visible in the cell 84.

Figure 6A:
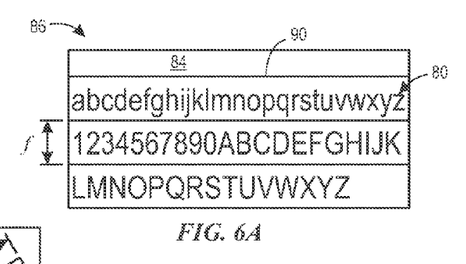
FIG. 6A depicts a string of unrotated, wrapped characters in a table cell.
Figure 6B:
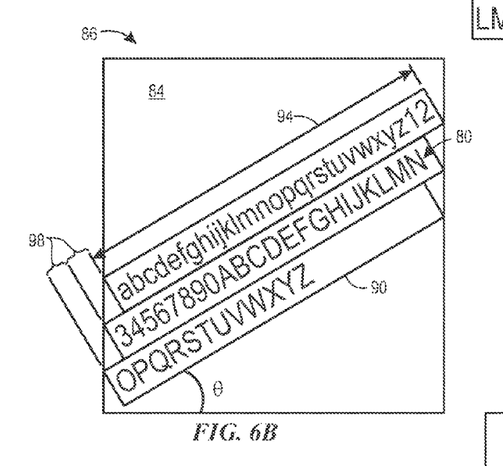
FIG. 6B depicts a first rotated string of wrapped characters in a table cell in accordance with aspect of the present disclosure.
Figure 6C:
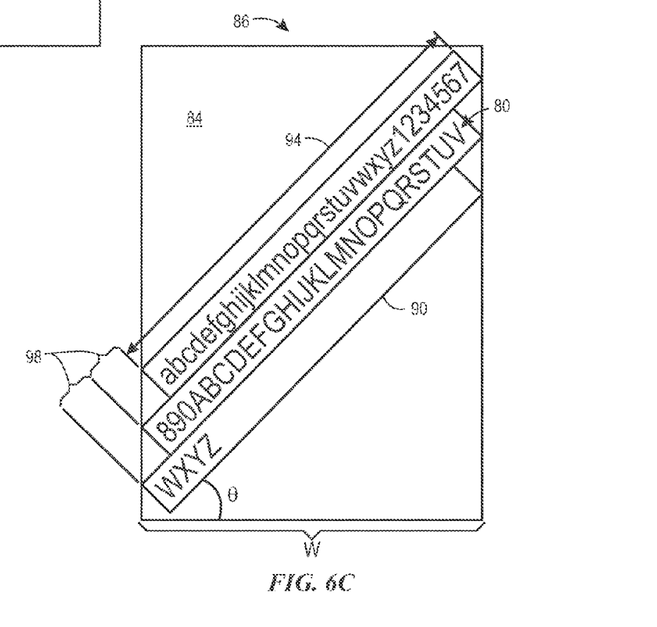
FIG. 6C depicts a second rotated string of wrapped characters in a table cell in accordance with aspect of the present disclosure.

For example, turning to FIG. 6A, a character string 80 having multiple lines of text (i.e., wrapped with respect to cell 84) is depicted in an unrotated state within a cell 84 of a table 86. FIGS. 6B and 6C depict the character string 80 displayed in a rotated and wrapped format with respect to cell 84 of the table. In the depicted embodiment, for the multiple lines of wrapped text, the prior determination of how much the bottom length 94 of a rotated text box 90 extends beyond the edge of the cell 84 (i.e., f·tan θ) can be used as an offset 98 for the wrapped line of character string 80 below a given line so that the wrapped lines of character string 80 also fit within the cell 84. When the character string 80 is rotated upward as one proceeds to the right, the subsequent, wrapped lines of the character string 80 are offset to the left of the preceding line by offset 98. Conversely, if the character string where rotated downward as one proceeds to the right, the subsequent, wrapped lines of the character string 80 are offset to the right of the preceding line by offset 98. Such an arrangement can be applied even as the character string is rotated past 180°. In certain implementations, to simplify text layout, once the length 94 of the rotated text box 90 and the offset 98 are determined based upon the specified angle of rotation θ, the character string 80 can be initially laid out in a non-rotated fashion and subsequently drawn into a rotated drawing context.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for displaying rotated text within a table cell, the method comprising:

displaying, on a screen of an electronic device, a table comprising one or more cells;

receiving an input comprising a character string for display in a respective cell comprising an initial width, wherein the character string is contained within a text box that is rotatable independent of the orientation of the respective cell;

receiving an angle of rotation by which the text box containing the character string is to be rotated when displayed in the respective cell;

dynamically resizing the text box based on the angle of rotation, wherein a dimension of the text box is lengthened based on the angle of rotation and the initial width of the respective cell and shortened based on a font height of the character string and the angle of rotation;

rotating the resized text box within the respective cell based on the angle of rotation; and displaying at least a portion of the character string within the rotated and resized text box within the respective cell, wherein the respective cell maintains the initial width while displaying the portion of the character string within the rotated and resized text box within the respective cell and wherein the portion of the character string displayed corresponds to the dimension of the resized text box such that, when displayed, the character string does not overflow the respective cell.

2. The method of claim 1, wherein dynamically resizing the text box comprises:

calculating an initial length of a line based on the initial width of the respective cell times the secant of the angle of rotation; and calculating a final length of the line by a subtracting an overrun portion from the initial length, wherein the overrun portion is calculated based on the height of a font of the character string times the tangent of the angle of rotation.

3. The method of claim 1, wherein the character string is wrapped, when displayed at the angle of rotation, if the character string does not fit within the resized text box at the angle of rotation.

4. The method of claim 3, wherein the character string is split into fragments all of which are less than the length of the resized text box and each fragment is displayed in consecutive, rotated lines within the respective cell.

5. The method of claim 4, wherein consecutive lines of the character string, when wrapped, are offset with respect to one another based on an amount corresponding to the font height of the character string and the angle of rotation.

6. A processor-implemented method for displaying a rotated character string within a cell of a table, the method comprising:

displaying a characters string within a text box within a cell of a table on a display of an electronic device, wherein the cell comprises an initial width;

based on an angle of rotation, dynamically resizing the text box with respect to the cell, wherein dynamically resizing the text box comprises lengthening the text box based on an angle of rotation and the initial width of the cell and shortening the text box based on a font height of the character string and the angle of rotation;

determining a portion of the character string corresponding to the resized text box; and displaying the portion of the character string within the resized text box, wherein the cell maintains the initial width while displaying the portion of the character string within the resized text box and wherein the resized text box is rotated by the angle of rotation within the cell such that the portion of the character string does not extend beyond the edges of the cell.

7. The processor-implemented method of claim 6, wherein the portion of the character string is truncated relative to the full character string.

8. The processor-implemented method of claim 6, further comprising displaying a remainder of the character string in a wrapped format at the angle of rotation in the cell.

9. The processor-implemented method of claim 8, wherein the wrapped format comprises one or more lines horizontally offset from one another in which the remainder of the character string are displayed.

10. A processor-based system, comprising:

a display;

a memory storing one or more routines; and a processing component configured to execute the one or more routines stored in the memory, wherein the one or more routines, when executed by the processing component, cause acts to be performed comprising:

receiving an angle of rotation via a user interaction with the processor-based system;

based at least in part on the angle of rotation, dynamically resizing a text box based on the angle of rotation, wherein a dimension of the text box is lengthened based on the angle of rotation and an initial width of a cell of a table displayed on the display and shortened based on a font height of a character string and the angle of rotation;

determining a portion of the character string corresponding to the resized text box; and displaying the portion of the character string in the resized text box rotated at the angle of rotation in the cell such that the displayed portion of the character string does not extend beyond the edges of the cell, wherein the cell maintains the initial width while displaying the portion of the character string in the resized text box rotated at the angle of the rotation in the cell.

11. The processor-based system of claim 10, wherein determining a portion of the character string further comprises defining a remainder portion of the character string that extends beyond the edges of the cell.

12. The processor-based system of claim 11, wherein the one or more routines, when executed by the processing component, cause additional acts to be performed comprising:

displaying the remainder portion of the character string at the angle of rotation in the cell in a wrapped format such that the displayed remainder portion of the character string does not extend beyond the edges of the cell.

13. A non-transitory, computer-readable medium storing one or more instructions executable by a processor of an electronic device, the instructions, when executed, performing acts comprising:

displaying a table comprising a plurality of cells;

receiving a character string to be displayed in a text box within a respective cell of the table at an angle relative to the respective cell, wherein the respective cell comprises an initial width;

based on the angle, dynamically resizing the text box, wherein a dimension of the text box is lengthened based on the angle and the initial width of the respective cell and shortened based on a font height of the character string and the angle; and displaying a portion of the character string in the resized text box rotated at the angle with respect to the respective cell, wherein the respective cell maintains the initial width while displaying the displaying the portion of the character string in the resized text box rotated at the angle with respect to the respective cell.

14. The non-transitory, computer-readable medium of claim 13, further comprising instructions, which when executed, perform acts comprising:

determining a remainder of the character string; and displaying the remainder in a wrapped and rotated format within the respective cell.

15. The non-transitory, computer-readable medium of claim 14, wherein the wrapped format is, in consecutive lines, offset horizontally by an offset derived based upon a font height of the character string and the angle.

16. A method, for displaying rotated text within a cell of a table, the method comprising:

displaying a table comprising a plurality of cells;

receiving an angle of rotation;

calculating an edge of a text box based at least in part upon the angle of rotation and an initial width of a respective cell and also upon the font height of a character string contained within the text box and the angle of rotation; and displaying the text box rotated by the angle of rotation within the respective cell, wherein the character string contained in the text box is limited in length to correspond to the edge of the text box, wherein the respective cell maintains the initial width while displaying the text box rotated by the angle of rotation within the respective cell.

17. The method of claim 16, wherein displaying the character string comprises wrapping the character string across multiple, rotated lines within the respective cell, wherein each line of the wrapped character string is limited in length to correspond to the edge of the text box.

18. The method of claim 17, wherein each line of the wrapped character string is offset horizontally from the previous line by a length based on the font height of the character string and the angle of rotation.

19. The method of claim 16, wherein the text box defines the extent and rotation of the display of the character string within the respective cell.

\* \* \* \* \*